United States Patent [19]
Drummond

[11] 3,973,549
[45] Aug. 10, 1976

[54] CRANKCASE-SUPPORTED OIL DRIP RECEIVER

[76] Inventor: Ronald B. Drummond, 26202 E. Via Serra, Capistrano Beach, Calif. 92624

[22] Filed: Oct. 23, 1975

[21] Appl. No.: 624,863

[52] U.S. Cl. .......................... 123/198 R; 180/69.1; 184/106; 296/38
[51] Int. Cl.[2] ........................................ B62D 25/20
[58] Field of Search .................. 123/198 R, 198 E; 296/38; 180/69.1; 184/106

[56] References Cited
UNITED STATES PATENTS

| | | | |
|---|---|---|---|
| 925,783 | 6/1909 | Miller | 296/38 |
| 971,550 | 10/1910 | Mullins | 296/38 |
| 1,199,542 | 9/1916 | Gammel | 184/106 |
| 2,751,729 | 6/1956 | Christiansen | 123/198 R |
| 3,354,989 | 11/1967 | Anderson | 180/69.1 X |
| 3,590,937 | 7/1971 | Andrews | 180/69.1 |
| 3,651,884 | 3/1972 | Dorries | 296/38 X |
| 3,779,330 | 12/1973 | Longpre | 180/69.1 |
| 3,809,175 | 5/1974 | Andrews | 180/69.1 |
| 3,918,542 | 11/1975 | Murillo | 180/69.1 |

*Primary Examiner*—Charles J. Myhre
*Assistant Examiner*—Ira S. Lazarus
*Attorney, Agent, or Firm*—William C. Babcock

[57] ABSTRACT

A lipped cylindrical container having a pouring spout integrally formed therewith, which container is removably supported in a desired vertically spaced relationship on the lowest external surface portion of an automotive crankcase, to receive oil that drips therefrom. The container is removably supported from the crankcase by a number of elongate permanent magnets that are vertically adjustable relative to the container. Due to the vertical adjustment of the magnet, the container may be removably supported from the lower surface portion of a crankcase, irrespective of whether this portion is of a flat or curved configuration.

4 Claims, 6 Drawing Figures

CRANKCASE-SUPPORTED OIL DRIP RECEIVER

BACKGROUND OF THE INVENTION

1. Field of the Invention

Crankcase-supported oil drip receiver.

2. Description of the Prior Art

The dripping of oil from the crankcase of an automotive vehicle onto a concrete surface is a nuisance in that the oil stains the concrete, and the stain is extremely difficult to remove therefrom.

The major object of the present invention is to provide a lipped container having a pouring spout, which container is removably and adjustably supported from the lowest external portion of the crankcase to receive oil that drips downwardly therefrom, as well as oil that leaks from the engine at elevated positions and then runs downwardly onto the surface of the crankcase by force of gravity to this lowest portion to drip downwardly therefrom onto the surface that supports the vehicle.

Another object of the invention is to provide a device that, in the main, may be formed from plastic, one in which oil or grease deposited therein will not spill therefrom when the vehicle to which the device is attached is in intermittent motion, with the device being adapted to have waste oil or grease easily poured therefrom after the device is removed from the vehicle.

Still another object of the invention is to supply a device that is simple and easy to use, can be secured to a ferrous crankcase without the use of tools, one that can be disposed in a grease and oil-receiving position under the drain plug of the crankcase, and the invention requiring a minimum of maintenance attention.

SUMMARY OF THE INVENTION

The invention includes a cylindrical container having a circumferentially extending lip projecting inwardly from the upper edge thereof, with the lipped inside wall of the container cooperating to define a spout from which grease and oil in the container may be poured. The inwardly extending lip prevents oil and grease that drained into the container being inadvertently displaced therefrom when the container is supported from the crankcase of the vehicle, and the vehicle is subjected to intermittent motion such as occurs in normal driving in cities where the vehicle periodically must stop for traffic signals at street crossings.

The invention is removably secured to the lowest portion of the crankcase by a number of circumferentially spaced permanent magnets of elongate shape that are vertically adjustable relative to the container and support the container from the crankcase. The magnets permit the lip of the container to be situated a slight distance below the lowest surface of the crankcase to permit oil that leaks from elevated positions on the crankcase to run downwardly on the external surface of the crankcase to the lowest portion thereof, and then drain by force of gravity into the magnet-supported container.

The invention is periodically removed from the crankcase, and by the use of the spout, grease and oil accumulated in the container may be deposited in a suitable waste receptacle.

DESCRIPTION OF THE PREFERRED EMBODIMENT

Figure 1:
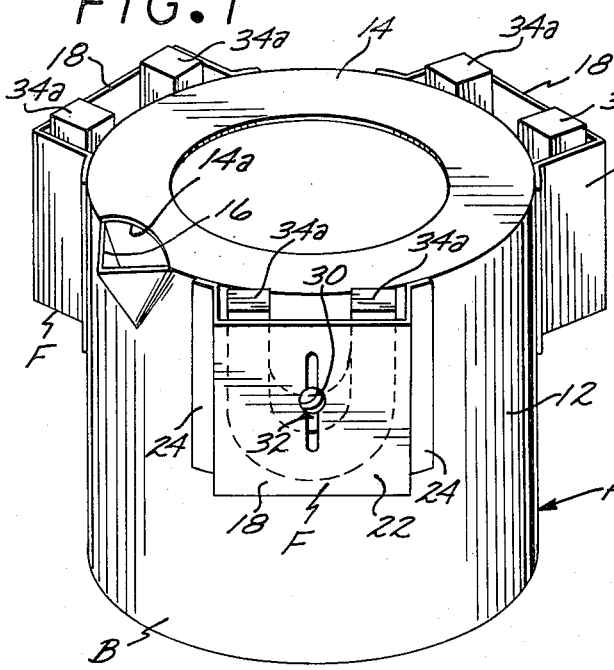
FIG. 1 is a perspective view of the invention.
Figure 2:
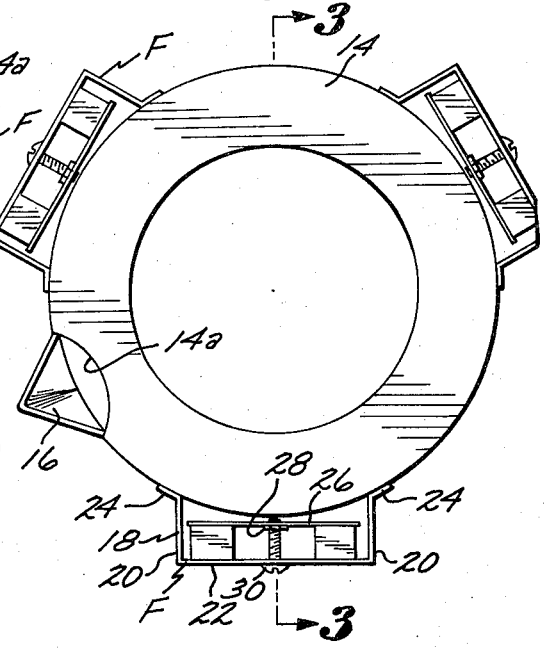
FIG. 2 is a top plan view of the device.
Figure 3:
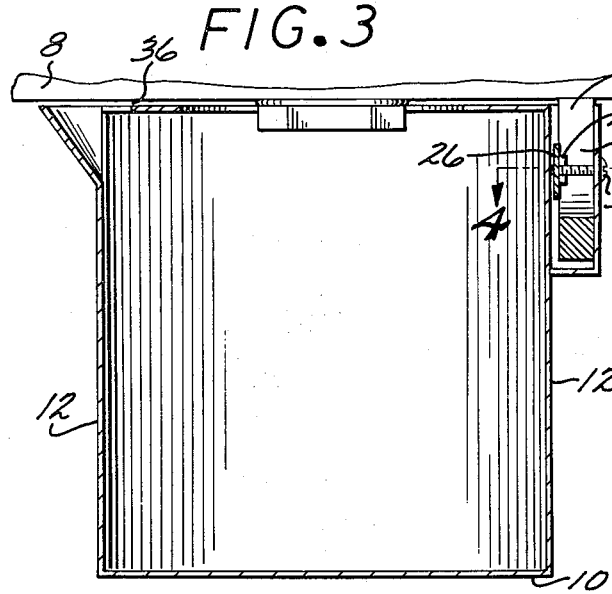
FIG. 3 is a side elevational view of the device removably secured to the lowest external surface portion of a crankcase.

The invention A, as may best be seen in FIGS. 1, 2 and 3, includes a cylindrical container B that may be removably secured to the lowest external portion 8 of an automotive crankcase in which a drain plug D is located, by magnetic means E. The container B includes a bottom 10 that has a cylindrical side wall 12 extending upwardly therefrom, with the side wall 12, on the upper periphery thereof, developing into an inwardly extending lip 14. The lip 14 has an opening 14a formed therein that is in communication with a pouring spout 16 formed in the side wall 12. The invention A is illustrated as having three angular U-shaped clips 18 secured to the external upper surface portion thereof is circumferentially spaced relationship.

Figure 4:
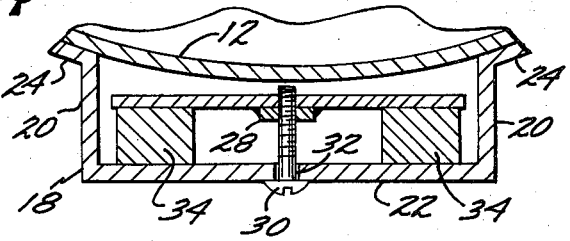
FIG. 4 is a fragmentary transverse cross-sectional view of the device, taken on the line 4—4 of FIG. 3.

Each clip 18 includes a pair of spaced legs 20 that are connected by a web 22. The pair of legs 20 have tabs 24 which extend outwardly in opposite directions therefrom, and are secured to the external surface of the cylindrical side wall 12 by conventional means. Each of the clips 18 has a plate 26 situated within the interior thereof, and each plate has a nut 28 secured thereto by conventional means. Each plate 26 has an elongate opening 32 formed therein through which a screw 30 extends to engage a nut 28. If plate 26 is relatively thick, the screw 30 may engage a tapped bore (not shown) formed therein and the nut 28 may be dispensed with. Horse show shaped permanent magnets 34 are disposed within the clips 18, as shown in FIG. 4, with each magnet having a pair upper end portion 34a. By loosening a screw 30, the plate 26 and web 22 may have the space therebetween increased to permit the magnets 34 to be adjusted vertically. After the magnets 34 have been adjusted so that they will contact the external surface of the lower crankcase portion 8, which surface may be either flat or curved, the screws 30 are tightened to force the plate 26 toward the web 22 to frictionally grip the pairs of magnets 34 therebetween with the first end portion 34a preferably extending upwardly above the container B to the extent that they are in contact with the external surface of the lowest portion 8 of the crankcase, which portion may be either flat or of curved configuration.

Figure 6:
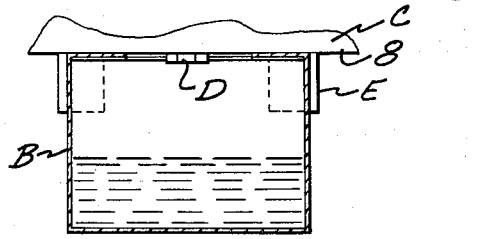
FIG. 6 is a longitudinal cross-sectional view of the invention mounted on an engine, and in a position to receive oil that drips from a crankcase from the lowest portion thereof, or from the drain plug forming a part of the crankcase.
Figure 5:
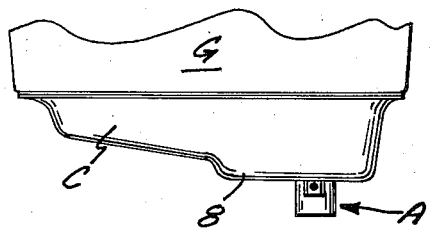
FIG. 5 is a side elevational view of a portion of a crankcase with the invention removably secured thereto.

The first end portions 34a of the magnets 34 project upwardly from the container B to the extent that a circumferential space 36 is defined between the external surface of the lowest portion 8 of the crankcase and the upper surface of the lip 14. Thus, oil dripping from the drain plug D, or leaking from the crankcase or engine at an elevation thereabove, will ultimately flow downwardly to the lowest portion on the crankcase and then drip by force of gravity into the container B when the latter is supported from the crankcase, as shown in FIGS. 5 and 6.

The use and operation of the invention A on a crankcase C forming a part of an engine G will be apparent from the prior description thereof. Although the invention A may be fabricated from a variety of materials, from the standpoint of low cost, as well as durability, the preferred material is a polymerized resin that is impervious to the action of oil.

I claim:

1. A device that is removably securable in a depending position from the exterior surface of the lowermost portion of a ferrous automotive crankcase of an internal combustion engine to receive oil that drips downwardly therefrom by force of gravity, said device including:
   a. an oil-receiving container that includes a bottom from which a cylindrical side wall having an exterior surface extends upwardly to develop into an inwardly extending lip, with said side wall being adjacent said lip and having a pouring spout defined therein, with said pouring spout being in radial alignment with an opening formed in said lip;
   b. a plurality of circumferentially spaced clips secured to said exterior surface of said side wall;
   c. a plurality of elongate permanent magnets having first end portions, with at least one of said magnets being disposed within each of said clips;
   d. a plurality of pressure plates disposed within said clips; and
   e. first manually operable means for moving said plates towards said clips to frictionally engage said magnets and maintain said first end portions thereof sufficiently above said lip that said first end portions contact and cling to said exterior surface of said lowermost portion, said lip being spaced from said exterior surface of said lowermost portion a sufficient distance to permit oil that leaks from said internal combustion engine or from an elevated position on said crankcase to flow downwardly by force of gravity on said external surface through said space between said external surface and said lip to drip into said container, with said lip preventing the discharge of oil from said container when said automotive vehicle on which it is mounted starts and stops, and with said device being manually removable from said crankcase when said vehicle on which it is mounted is stationary to permit oil collected in said container to be poured therefrom through said spout.

2. A device as defined in claim 1 wherein said first means includes:
   f. a plurality of nuts secured to said plates; and
   g. a plurality of screws that extend through openings in said clips to engage said nuts, with said screws when rotated in an appropriate direction moving said plates in a direction to frictionally grip said magnets between said plates and clips.

3. A device as defined in claim 2 wherein each of said clips has a pair of said magnets disposed therein, with the magnets of each of said pairs being located on opposite sides of said screws.

4. A device as defined in claim 1 wherein said magnets are of generally horse shoe shape.

* * * * *